Figure 3:
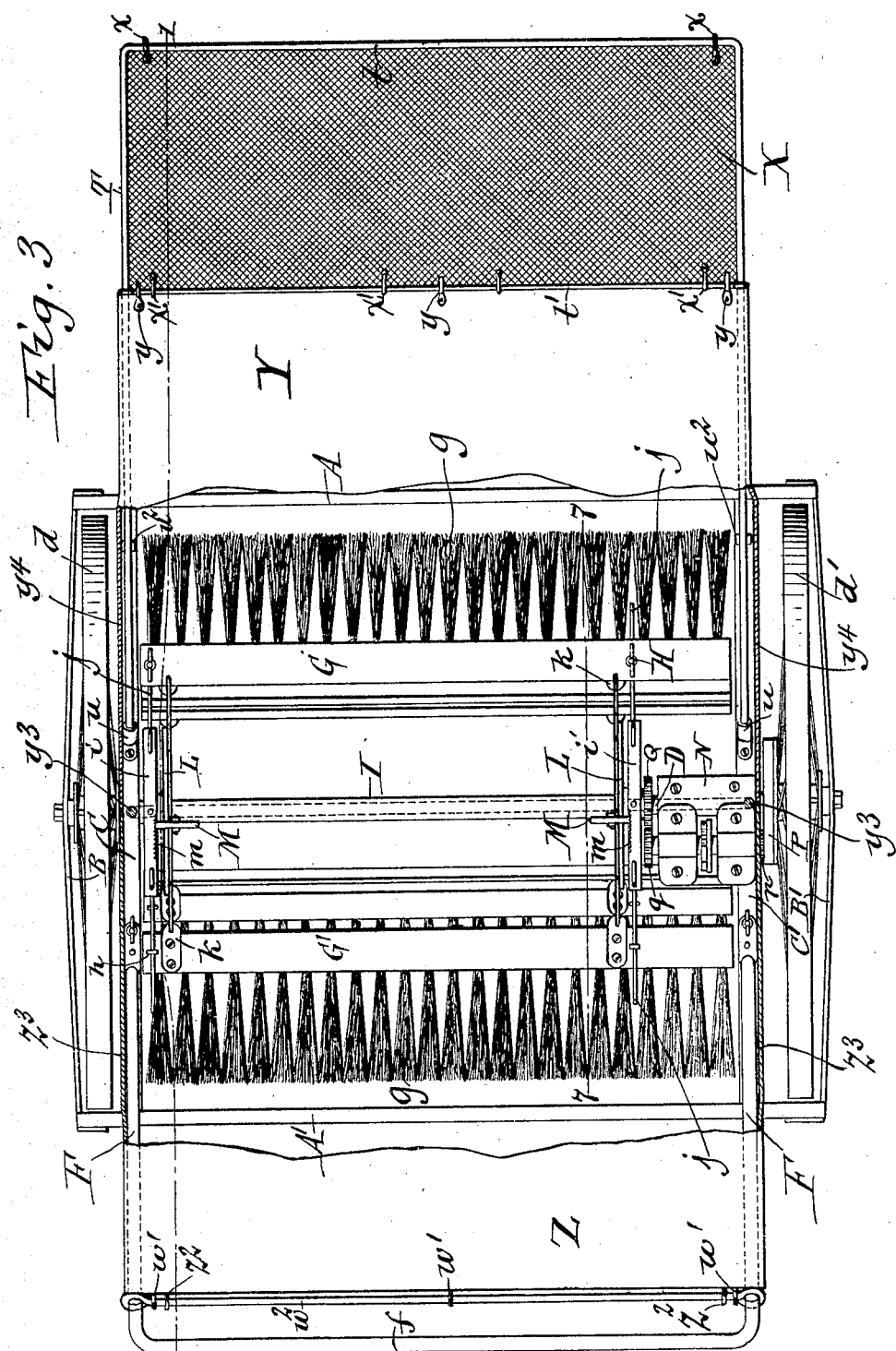

No. 872,409. PATENTED DEC. 3, 1907.
T. T. ELDRED.
LAWN SWEEPER.
APPLICATION FILED JAN. 3, 1907.
4 SHEETS—SHEET 1.
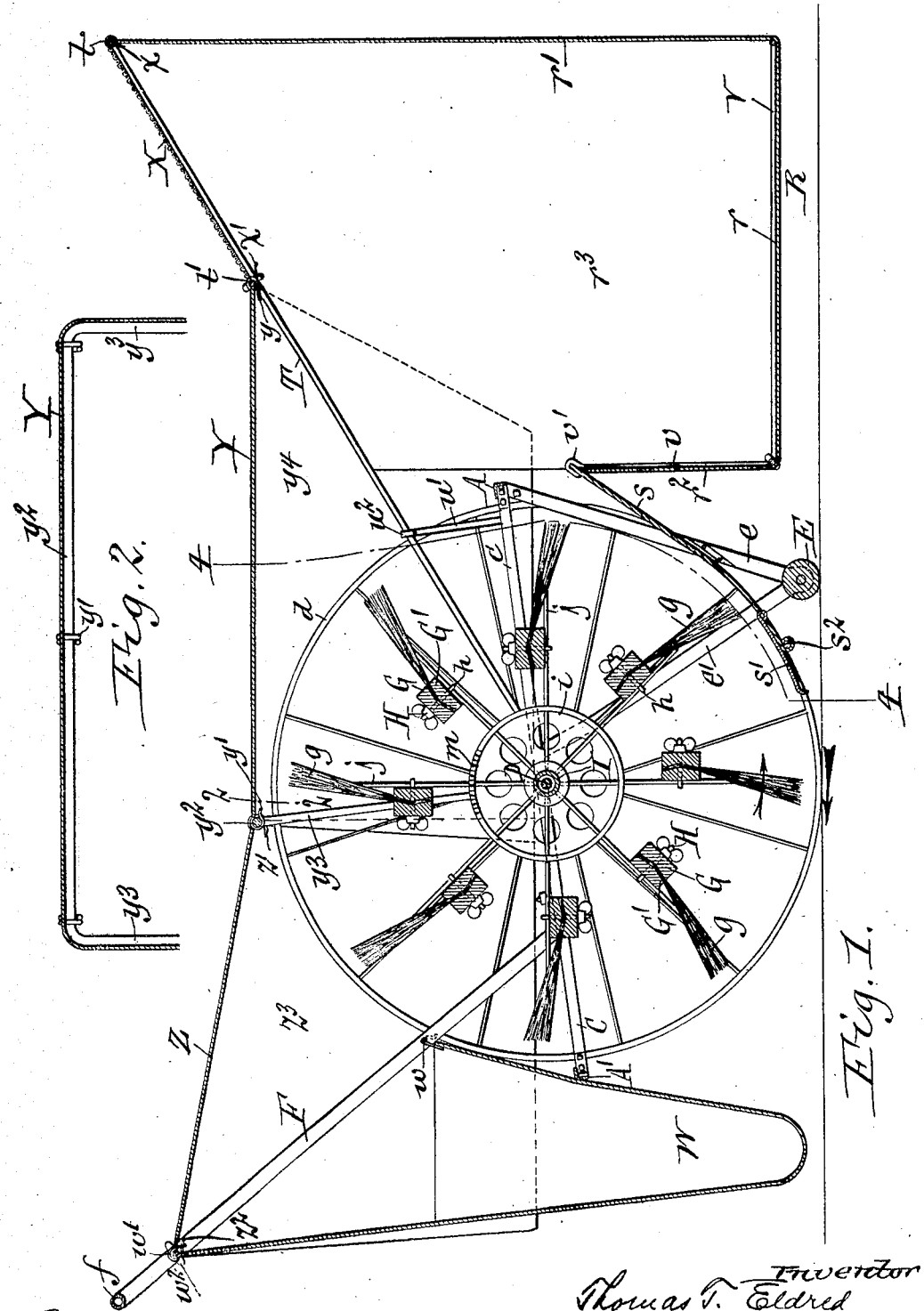

No. 872,409. PATENTED DEC. 3, 1907.
T. T. ELDRED.
LAWN SWEEPER.
APPLICATION FILED JAN. 3, 1907.

4 SHEETS—SHEET 2.

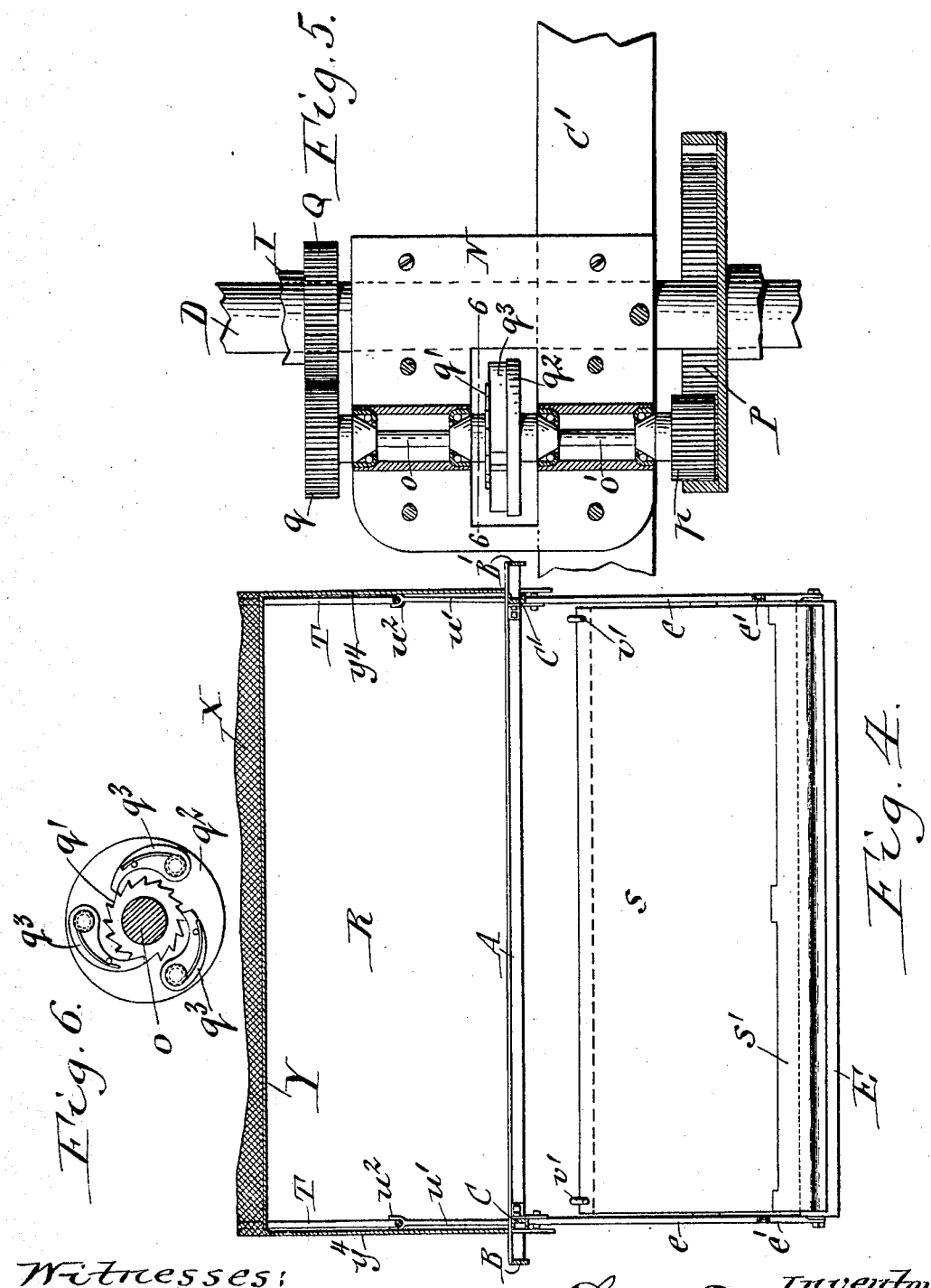

No. 872,409. PATENTED DEC. 3, 1907.
T. T. ELDRED.
LAWN SWEEPER.
APPLICATION FILED JAN. 3, 1907.
4 SHEETS—SHEET 4.
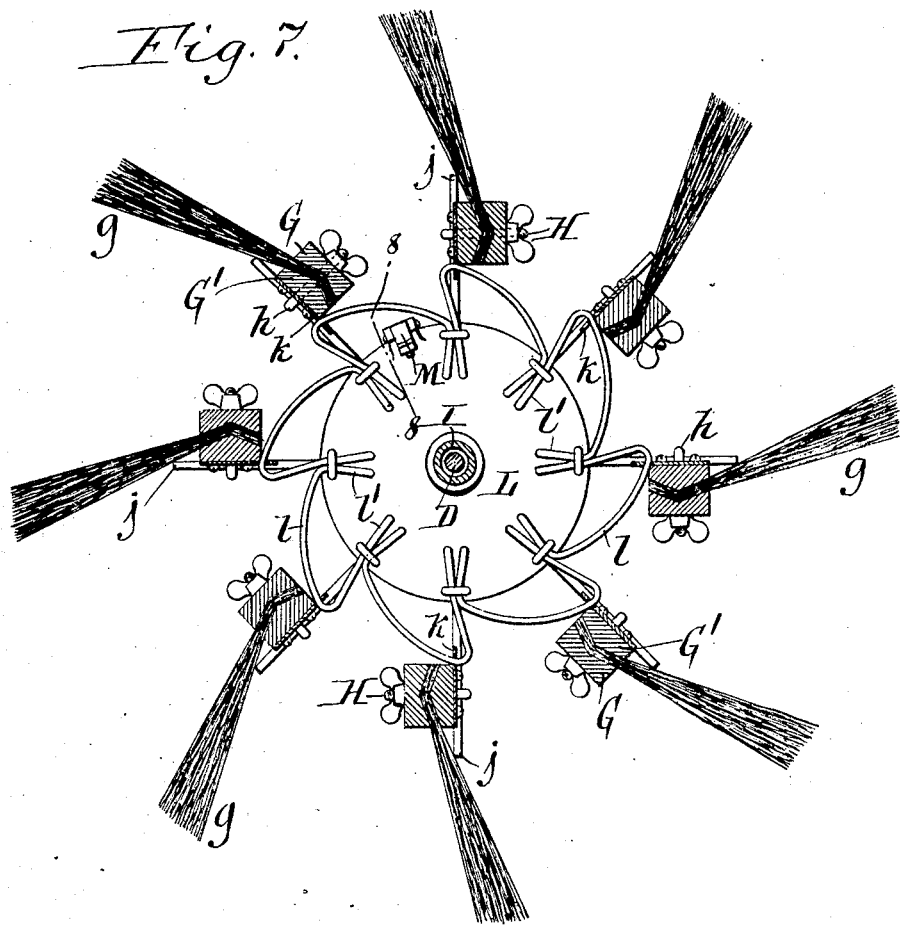
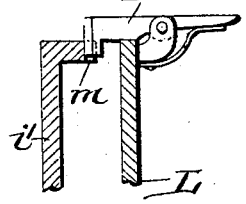
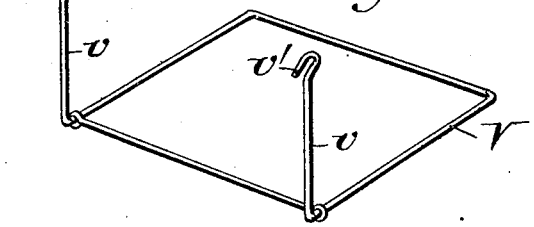

UNITED STATES PATENT OFFICE.

THOMAS T. ELDRED, OF BUFFALO, NEW YORK.

LAWN-SWEEPER.

No. 872,409.  Specification of Letters Patent.  Patented Dec. 3, 1907.

Application filed January 3, 1907. Serial No. 350,598.

*To all whom it may concern:*

Be it known that I, THOMAS T. ELDRED, a citizen of the United States, residing at Buffalo, in the county of Erie and State of New York, have invented a new and useful Improvement in Lawn-Sweepers, of which the following is a specification.

This invention relates to a sweeper for removing the dried leaves, paper and other material from lawns.

The object of this invention is to produce an improved sweeper of this character which is of simple and durable construction; which is very effective in operation and which can be readily adjusted to suit the height of the grass or other conditions.

In the accompanying drawings consisting of 4 sheets: Figure 1 is a vertical longitudinal section of my improved lawn sweeper taken in line 1—1, Fig. 3. Fig. 2 is a fragmentary cross section thereof in line 2—2, Fig. 1. Fig. 3 is a top plan view of the sweeper, partly in section. Fig. 4 is a fragmentary vertical cross section taken generally in line 4—4, Fig. 1. Fig. 5 is a fragmentary horizontal section, on an enlarged scale, showing the brush driving mechanism. Fig. 6 is a fragmentary sectional elevation taken in line 6—6, Fig. 5, and showing the ratchet device in the brush driving mechanism. Fig. 7 is a vertical section, on an enlarged scale in line 7—7, Fig. 3, showing the means for adjusting the several sections of the rotary brush. Fig. 8 is a fragmentary section, on an enlarged scale, taken in line 8—8, Fig. 7, and showing the means whereby a brush adjusting device is locked in position. Fig. 9 is a perspective view of the means for holding the lower part of the front sweeping receptacle in a distended condition.

Similar letters of reference refer to like parts in the several figures.

The main frame of this sweeper consists essentially of front and rear transverse bars A, A¹, two outer longitudinal bars B, B¹, each of which connects a corresponding pair of ends of the transverse bars, and two inner longitudinal bars C, C¹ each of which connects the longitudinal bars at a distance from their outer ends.

D represents a horizontal axle which is arranged transversely midway between the front and rear transverse bars and secured at opposite ends to the inner and outer longitudinal bars of the frame.

$d$, $d^1$ represent the two main or supporting wheels of the sweeper each of which is arranged between one of the outer longitudinal bars and the adjacent inner longitudinal bar of the main frame and is journaled upon the adjacent part of the axle preferably by means of a ball bearing so that the same turns easily.

Resting upon the ground transversely in front of the resting point of the supporting wheels is a horizontal auxiliary supporting roller E which is pivoted at its opposite ends on the lower ends of legs which depend from the main frame. Each of these legs preferably consists of two upright bars $e$, $e^1$ which diverge upwardly from the pivot at one end of the supporting roller and are secured at their upper ends to the adjacent front part of one of the inner longitudinal bars of the main frame.

The sweeper is pushed by hand over the lawn or other surface which is to be swept by means of a handle consisting of two forwardly inclined side bars F connected at their upper rear ends by a cross bar $f$ while their lower front ends are secured to the inner longitudinal bars of the frame between the rear cross bar and the axle.

Rotating about the axle is a brush whereby the dried leaves and other debris is swept from the lawn forwardly into a receptacle provided for this purpose. This brush preferably consists of a plurality of sections which are arranged in an annular series or row around the axle and each of which is composed of a transverse row of tufts or bristles $g$ of any suitable material which are secured at their inner ends between the two transverse bars G, G¹ of a stock. These bars are clamped or pressed against opposite sides of the bristles by means of clamping bolts H passing through the stock bars at opposite ends thereof.

I represents the hub of the brush which is of tubular form and mounted concentrically on the axle so as to inclose the same and be capable of rotation independent thereof. At opposite ends the hub is provided with heads $i$, $i^1$ each of which has a plurality of guiding or supporting arms $j$ upon which the respective ends of the brush stocks are adjustably mounted. The preferred means of connecting each brush stock at opposite ends with a corresponding pair of supporting arms consists in forming eyes or openings $h$ in the heads of the clamping bolts H and arranging the guide arms $j$ in said openings. After the brush stocks have been adjusted radially on the supporting arms into the desired position, the nuts of the clamping bolts are tightened for holding them in position. This radial adjustment of the brush sections is necessary to compensate for wear at the outer ends of the bristle and also for increasing or decreasing the diameter of the brush so that the same approaches more or less closely to the surface of the ground or the grass, according to the length of the grass and other conditions, and permit of sweeping the dried leaves and other matter which litter the lawn from the same without injuriously affecting the grass.

In order to permit of adjusting the brush quickly to meet different conditions, means are provided whereby the several sections thereof may be simultaneously moved radially on the supporting arms. These means in their preferred form are shown in Figs. 3, 7 and 8 and are constructed as follows:

K represents plates secured to the opposite ends of the several stocks of the brush and each provided at its inner end with an opening forming an eye.

Adjacent to opposite ends of the brush stocks two adjusting disks or wheels L are rotatably mounted on the hub of the brush and each of these disks is provided with a cam which is operatively connected with the adjacent end of each of the brush stocks. In its preferred form this cam consists of a piece of wire which is bent to form an outer curved or cam portion $l$ which is arranged eccentrically with reference to the axis of the adjusting disk, and two arms $l^1$, $l^1$ which project inwardly from opposite ends of the cam portion. The cam portion $l$ passes through the eye $k$ of the adjacent brush stock and its arms are secured to the inner side of the adjacent adjusting disk.

Upon rotating the two adjusting disks about the hub of the brush in one direction or the other, the several cams of the disks simultaneously shift the respective ends of the brush stocks either inwardly or outwardly. After adjustment each of the disks L is held in position by means of a spring pressed catch M pivoted on the peripheral portion of the disk and engaging with one of a segmental row of notches $m$ in the adjacent head of the brush hub, as shown in Figs. 1, 3, 7 and 8.

Upon moving the sweeper forwardly over the lawn, the brush is rotated in a direction opposite to that of the supporting wheels whereby the leaves and other material picked up from the lawn are discharged forwardly into a receptacle provided for this purpose. The motion for thus rotating the brush is derived from one of the supporting wheels of the sweeper and is preferably constructed as follows:

As shown in Fig. 3, the head $i$ at the left end of the brush hub is arranged close to the inner side of the adjacent inner longitudinal frame bar C and its arms support the brush stocks at the extreme left end thereof but the other or right head $i^1$ of this hub is arranged at a distance from the opposite inner longitudinal frame bar and its arms support the brush stocks at a distance from the respective ends thereof. By this means a clearance space is formed between the head $i'$ of the hub and the adjacent inner frame bar $C^1$ in which is located the mechanism whereby the motion is transmitted from the adjacent supporting wheel $d^1$ to the brush for rotating the latter. This transmitting mechanism consists essentially of a bracket N secured to the inner frame bar $C^1$ and projecting inwardly therefrom adjacent to the axle into the clearance space, a countershaft composed of inner and outer sections $o$, $o^1$ which are journaled on said bracket axially in line with each other and parallel with the axle, an outer gear pinion $p$ secured to the outer end of the outer counter-shaft section and meshing with an internal gear wheel or rim P secured concentrically to the inner side of the adjacent supporting wheel $d^1$, an inner gear pinion $q$ arranged on the inner end of the inner counter-shaft section and meshing with a gear wheel Q on the adjacent end of the brush hub, a ratchet wheel $q^1$ secured to the outer end of the inner counter-shaft section and having its teeth provided with abrupt front faces and inclined rear faces, a head or disk $q^2$ arranged on the inner end of the outer counter-shaft section and spring pressed pawls $q^3$ pivoted on the inner side of the disk and engaging with the teeth of said ratchet wheel, as shown in Figs. 3, 5 and 6.

Upon moving the sweeper forwardly, the rotation of the supporting wheel $d^1$ is transmitted by this mechanism to the brush so that the latter is turned opposite to the supporting wheels but when the sweeper is drawn backwardly the supporting wheels are free to move in this direction independently of the brush owing to the ratchet coupling between the two sections of the countershaft.

The receptacle arranged in front of the brush for receiving the leaves which are picked up from the grass and swept forwardly by the brush, preferably consists of a bag R which is constructed of flexible material such as woven fabric. This bag has a flat bottom $r$ arranged close to the ground, a front wall $r^1$ extending with its upper edge above the top of the supporting wheels, a rear wall $r^2$ terminating at its upper end below the axle of the supporting wheels and side walls $r^3$ having their upper edges inclined rearwardly.

The material swept from the lawn by the brush is directed into the open upper end of the bag or receptacle by means of an inclined guide plate consisting of an inclined front section $s$ secured at its opposite ends to the legs $e$, $e^1$ and extending from the upper edge of the rear wall $r^2$ downwardly and rearwardly underneath the front part of the brush, and a rear section $s^1$ extending from the lower part of the front section rearwardly underneath the brush to a point close to the ground between the supporting roller and the supporting wheels, as shown in Fig. 1. The rear guide section is pivoted at its front end on the front section in front of the rear end thereof, so as to be capable of swinging in a vertical plane. In its lowermost position the rear guide section rests upon a stop $s^2$ formed by the rear end of the front section. If during the forward movement of the sweeper the rear guide section strikes a high part of the lawn or other obstruction, the same yields upwardly so as to clear the obstruction and after passing the same it again drops by gravity into its normal depressed position, thereby preventing injuring the grass at such high points of the lawn and also preventing injuring the guide if the same strikes other obstructions.

The front receptacle R may be detachably supported upon the main frame in any suitable manner but preferably by the means shown in the drawings which are constructed as follows:

T, T represent the longitudinal side bars and $t$ the transverse front bar of a U-shaped frame which supports the receiving bag R at its upper end, the front bar $t$ is secured to the upper edge of the front wall of the bag while the side bars thereof incline downwardly and rearwardly and have the side walls of said bag attached thereto. Each of said side bars is detachably secured at its rear end to the main frame by means of a socket $u$ arranged upon the adjacent rear longitudinal bar of the main frame near the axle and receiving the rear end of the side bar and a post $u^1$ secured at its lower end to said frame bar in front of the socket and provided at its upper end with a fork $u^2$ which receives the adjacent portion of the side bar T. The relative arrangement of the socket and post is such that after the bag supporting bar T is inserted in the socket, it is necessary to spring this bar upwardly somewhat in order to insert the same in the fork of the post, whereby a sufficient tension is produced upon this bar to hold the same frictionally in place while in use.

The lower part of the main receiving bag is held in its distended position by means of a frame composed of a rectangular lower part V which fits into the bottom of the receiving bag and two arms $v$ projecting upwardly from the opposite rear corners of said lower part and provided at their upper ends with hooks $v^1$ which engage removably with the upper front edge of the front guide section.

In order to catch any leaves which may be carried backwardly over the top of the brush and discharge on the rear side thereof, an auxiliary receptacle W is provided consisting preferably of a bag arranged transversely in rear of the brush and having the upper edge of its low front wall detachably secured by hooks $w$ to the side bars of the handle adjacent to the path of the brush while the upper edge of its high rear wall is detachably secured by means of hooks $w^1$ with an auxiliary cross bar $w^2$ which connects the side bars of the handle in front of the main cross bar $f$ thereof.

In the absence of any provision to prevent it, the leaves which are swept upwardly by the brush are liable to be scattered to a large extent in windy weather instead of being discharged wholly into the receptacles provided for that purpose. To prevent this a covering is provided for the top of the front and rear receptacles and the brush which consists of a foraminous or perforated front section X constructed preferably of woven wire or screening and arranged over the front part of the front receptacle, an imperforate central section Y extending over the rear part of the front receptacle and the front part of the brush, and a rear section Z extending over the rear part of the brush and the rear receptacle.

The front screen section is held in place by means of hooks $x$ at its front end engaging with the main cross bar $t$ and hooks $x^1$ at its rear edge engaging with an auxiliary cross bar $t^1$ which connects the side bars T at a distance in rear of the main cross bar $t$.

The central cover section is detachably connected at its front end by hooks $y$ with the cross bar $t^1$ while its rear end is connected in like manner by hooks $y^1$ with the upper horizontal cross bar $y^2$ of a U-shaped frame the upright posts $y^3$ of which are connected at their lower ends with the central parts of the inner longitudinal frame bars.

The rear cover section is detachably connected at its front and rear ends by hooks $z^1$, $z^2$ with the cross bars $y^2$, $w^2$.

On their opposite sides the brush and the front and rear receptacles are covered by flaps $y^4$, $z^3$ depending from opposite edges of the central and rear cover sections, the flaps on the same side overlapping each other and the adjacent upper parts of the front and rear receptacles, as shown, to form a practically tight joint between the same.

By constructing the front part of the cover of perforated material such as woven wire, an exit is provided for the current of air which is directed into the front receptacle together with the leaves by the rotary brush, thereby permitting the leaves to enter the receptacle and separate from the air and accumulate in the receptacle. In the absence of such an air outlet a back pressure would be produced on the air loaded with sweepings which would interfere with proper entrance of the same into the receptacle and also prevent reliable separation of the same.

I claim as my invention:

1. A lawn sweeper comprising a frame, supporting wheels for said frame, a rotatable brush arranged within the frame, and means for operating said brush comprising an internal gear wheel secured to one of said supporting wheels, a counter-shaft mounted on the frame and composed of inner and outer sections, a ratchet connection between said sections, a pinion secured to the outer counter shaft section and meshing with said internal gear wheel, a pinion secured to the inner counter shaft section, and a gear wheel meshing with said last mentioned pinion and secured to the hub of said brush, substantially as set forth.

2. A lawn sweeper comprising a frame having transverse bars and longitudinal bars, an axle mounted transversely on the frame, supporting wheels mounted on the axle, a rotatable brush having a hub rotating about said axle, a head arranged at one end of the hub close to one of the longitudinal bars, a head arranged on the hub at a distance from the opposite longitudinal bar forming a clearance space between the same and an annular row of brush sections mounted on said heads and extending with their opposite ends close to both of said longitudinal bars, and means for operating said brush consisting of a bracket arranged in said clearance space and secured to the adjacent longitudinal bar, a counter shaft journaled on said bracket parallel with said axle and hub, an internal gear wheel secured to one of said supporting wheels, a pinion arranged on one end of the counter shaft and meshing with the internal gear wheel, a gear wheel secured to said brush hub and a pinion secured to said counter shaft and meshing with the last mentioned gear wheel, substantially as set forth.

3. A lawn sweeper comprising a frame, supporting wheels for said frame, a rotatable brush mounted on said frame and operating to deliver the sweepings forwardly, a receptacle for the sweeping arranged in front of the brush and consisting of a flexible bag, and means for supporting the upper end of the bag consisting of two side bars and a cross bar connecting the front ends of the side bars, sockets arranged on the frame and receiving the rear ends of said side bars, and posts arranged on the frame in front of said sockets and provided at their upper ends with forks which receive said side bars, substantially as set forth.

4. A lawn sweeper comprising a frame, supporting wheels for said frame, a rotatable brush mounted on said frame and operating to deliver the sweepings forwardly, a receptacle for the sweepings arranged in front of the brush and consisting of a flexible bag, a guide plate for the sweepings secured to the frame between the brush and bag, and means for holding the lower part of the bag in a distended condition consisting of a distending frame arranged within the bag and arms projecting upwardly from the rear end of said distending frame and provided at their upper ends with hooks which engage with said guide plate, substantially as set forth.

5. A lawn sweeper comprising a frame, supporting wheels for said frame, a rotatable brush mounted in said frame and operating to deliver the sweepings forwardly, a receptacle supported on the frame in front of the brush and adapted to receive the sweepings from the brush at its upper end, a perforated cover section arranged over the front part of said receptacle, a tight cover section arranged over the rear part of the receptacle and the front part of the brush, a cross bar which receives the rear end of said tight cover section and posts arranged on the frame and connected with opposite ends of said cross bar, substantially as set forth.

Witness my hand this 27th day of December, 1906.

THOMAS T. ELDRED.

Witnesses:
THEO. L. POPP,
E. M. GRAHAM.